(12) United States Patent
Nakajima

(10) Patent No.: US 11,249,703 B2
(45) Date of Patent: Feb. 15, 2022

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Satoru Nakajima, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/891,260

(22) Filed: Jun. 3, 2020

(65) Prior Publication Data

US 2020/0387333 A1 Dec. 10, 2020

(30) Foreign Application Priority Data

Jun. 10, 2019 (JP) .............................. JP2019-108228

(51) Int. Cl.
*G06F 3/12* (2006.01)
(52) U.S. Cl.
CPC ............ *G06F 3/1238* (2013.01); *G06F 3/126* (2013.01); *G06F 3/1222* (2013.01)
(58) Field of Classification Search
None
See application file for complete search history.

(56) References Cited

U.S. PATENT DOCUMENTS

| 10,691,384 | B2 * | 6/2020 | Kaneko | G06F 3/1267 |
|---|---|---|---|---|
| 2010/0079800 | A1 * | 4/2010 | Muto | G06F 3/1259 |
| | | | | 358/1.15 |
| 2017/0177985 | A1 * | 6/2017 | Hayashi | G06F 3/1285 |

FOREIGN PATENT DOCUMENTS

JP 2006-076014 A 3/2006

* cited by examiner

*Primary Examiner* — Frantz Bataille
(74) *Attorney, Agent, or Firm* — Venable LLP

(57) ABSTRACT

A printing apparatus executes a set of instructions to receive a print job from an external apparatus, store in a storage device the received print job in association with user identification information, perform a user authentication, and specify print jobs which are stored in the storage device and are associated with user identification information of the authenticated user. At least one of the print jobs specified in accordance with success of the user authentication is executed. In a case where a total number of pages of the specified print jobs exceeds an upper limit number, one or more print jobs from among the specified print jobs are executed, wherein a total number of pages of the one or more print jobs falls within the upper limit number, and wherein the upper limit number is a fixed value used for a one-time process executed in accordance with success of the user authentication.

13 Claims, 12 Drawing Sheets

FIG. 7B

Conon GLX Printer Driver Properties

| BASIC SETTINGS | PAGE SETTINGS | FINISHING | SHEET FEED | PRINT QUALITY |

FAVORITES: DEFAULT SETTING ▼

OUTPUT METHOD: PRINT ▼ — 707

DOCUMENT SIZE:
A4 ▼

OUTPUT SHEET SIZE:
SAME DOCUMENT SIZE ▼

PAGE LAYOUT:
1 in 1 ▼

OUTPUT SHEET SIZE:
SINGLE-SIDED ▼

BINDING DIRECTION:
LONG-SIDE BINDING (LEFT) ▼

STAPLE / SORT / GROUP:
SORT ▼

COLOR MODE:
AUTOMATIC (COLOR / BLACK AND WHITE) ▼

SETTING CONFIRMATION

RETURN DEFAULT

NUMBER OF COPIES: [1] COPY

PRINT ORIENTATION:
[●] PORTRAIT  [○] LANDSCAPE

[☐] DESIGNATE MAGNIFICATION [100] %

BIND DETAILS...

BINDING MARGIN...

DESIGNATE STAPLE POSITION...

SET NUMBER OF COLORS...

HELP

OK    CANCEL — 709

BIBLIOGRAPHIC INFORMATION TABLE 1001
UserA:

| 1002 DATE/TIME | 1003 IP ADDRESS | 1004 STORAGE LOCATION | 1005 PRINT JOB NAME | 1006 PRINT SETTING | 1007 NUMBER OF PAGES | 1008 PASSWORD | 1009 PRINT STATUS |
|---|---|---|---|---|---|---|---|
| 2016/4/10 10:34:45 | 192.168.2.11 | /data/0015/xxx | AAA.txt | SINGLE-SIDED 1 COPY MONOCHROME | 2 | NO | ALREADY PRINTED |
| 2016/4/20 13:50:22 | 192.168.2.11 | /data/0591/yyy | BBB.pdf | DOUBLE-SIDED 3 COPIES COLOR | 40 | YES | WAITING TO PRINT |
| 2016/5/28 14:10:00 | 192.168.2.11 | /data/8125/zzz | CCC.doc | DOUBLE-SIDED 5 COPIES 2in1 COLOR | 25 | NO | WAITING TO PRINT |

FIG. 12
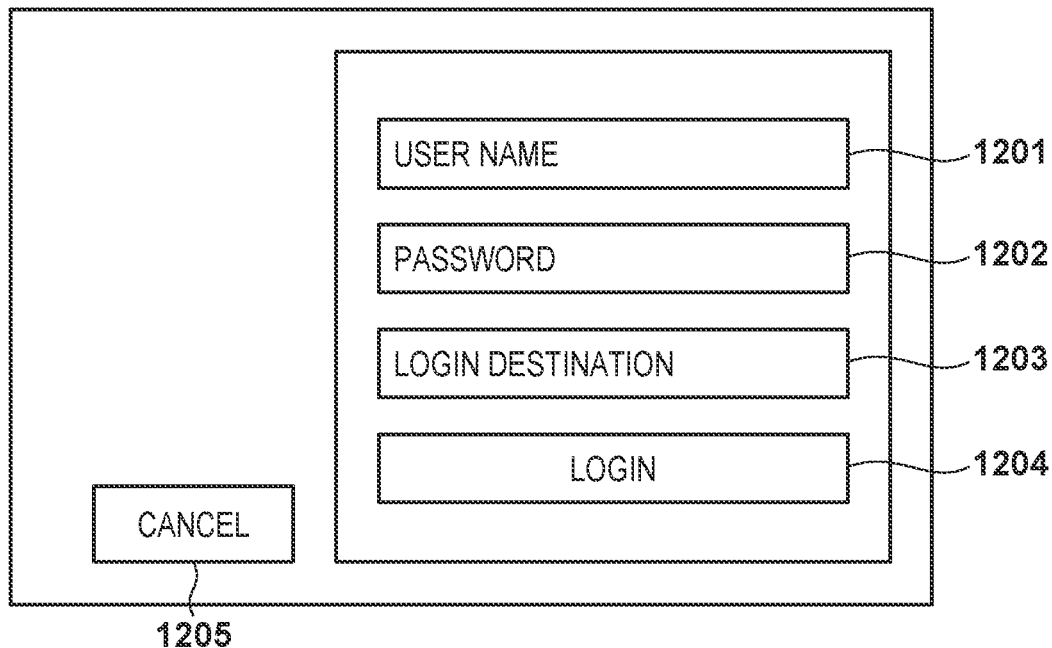
FIG. 13
| USER NAME | LOGIN PASSWORD | ROLE |
|---|---|---|
| UserA | 1111 | General |
| UserB | 2222 | General |
FIG. 14
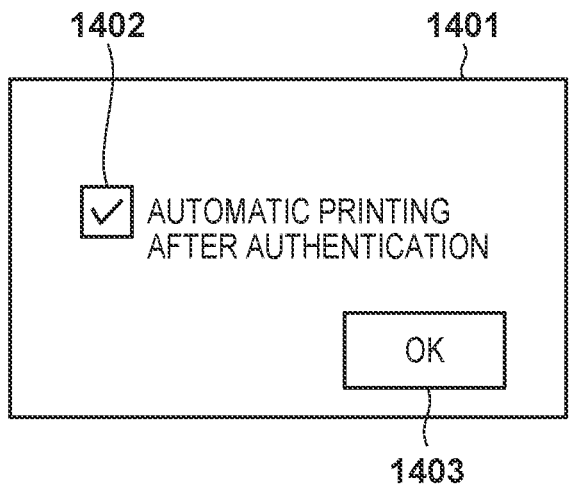
FIG. 15
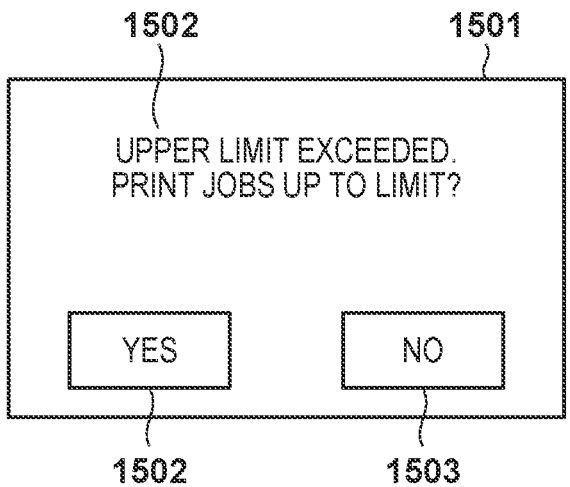

PRINTING APPARATUS, METHOD OF CONTROLLING THE SAME, AND STORAGE MEDIUM

BACKGROUND OF THE INVENTION

Field of the Invention

The present disclosure relates to a printing apparatus capable of saving a print job and executing the saved print job, a method of controlling the same, and a storage medium.

Description of the Related Art

There are image forming apparatuses that have a function called a retention print for security purposes. The image forming apparatus, rather than immediately outputting a print job inputted from a printer driver, first saves the print job in a hard disk region allocated as a queue for retaining print jobs in the image forming apparatus. Then, after a user logs in, the image forming apparatus displays a list of print jobs for that user on an operation unit. On the image forming apparatus, the user selects a print job from the list to make a print instruction to print the print job. Also, there is a technique in which, upon log in, print jobs of the user that logged in are automatically printed without a print instruction by the user. This technique is effective as a means for efficiently performing printing since the printing is executed without the user needing to select a print job and make a print instruction on the operation unit. On the other hand, in the case where a large number of print jobs for the user are saved, it will require a long time for the printing of all of the print jobs to complete, and the image forming apparatus will be monopolized during that time. In a technique for limiting printing of print jobs, a printer that stops printing when the number of print pages of the currently printing print job reaches a limit value of a maximum sheet discharge number is disclosed (Japanese Patent Laid-Open No. 2006-76014).

Since a limit is put on a single print job in Japanese Patent Laid-Open No. 2006-76014, it is not possible thereby to put a restriction on the accumulation of pages of all of the print jobs that are to be printed in the case where a plurality of print jobs are printed collectively. Also, since printing is stopped when the limit value is reached, the subsequent print operation is complicated since a print job is only printed part way through.

SUMMARY OF THE INVENTION

The present disclosure was conceived in view of the above conventional art, and has as an object to provide an image forming apparatus that, even in a case where retention printing is performed collectively for a plurality of print jobs, can prevent monopolization by the print jobs, a method of controlling the same, and a program.

According to one aspect of the present invention there is provided a printing apparatus comprising: one or more memories; and one or more processors that execute a set of instructions to: receive from an external apparatus one or more print jobs with which user identification information is associated; save in the one or more memories the received print jobs in association with the user identification information; perform a user authentication by using inputted user identification information; and execute the print jobs associated with the inputted user identification information, in accordance with success of the user authentication, wherein the print jobs to be executed are decided so that a total number of pages to be outputted does not exceed an upper limit number.

According to another aspect of the present invention there is provided a printing apparatus comprising: one or more memories; and one or more processors that execute a set of instructions to: receive from an external apparatus one or more print jobs with which user identification information is associated; save in the one or more memories the received print jobs in association with the user identification information; perform a user authentication by using inputted user identification information; and execute the print jobs associated with the inputted user identification information, in accordance with success of the user authentication, wherein the print jobs that are to be executed are decided from among the saved print jobs so that a set upper limit number of jobs is not exceeded.

Further features of the present invention will become apparent from the following description of exemplary embodiments with reference to the attached drawings.

BRIEF DESCRIPTION OF THE DRAWINGS

FIG. 7A and FIG. 7B are views illustrating one example of a screen after a print instruction.

FIG. 10 is a view illustrating one example of a bibliographic information table.

FIG. 12 is a view illustrating one example of a login screen.

FIG. 13 is a view illustrating one example of a user management table.

FIG. 14 is a view illustrating one example of a setting screen of automatic printing after authentication.

FIG. 15 is a view illustrating one example of a warning screen.

DESCRIPTION OF THE EMBODIMENTS

First Embodiment

Figure 1:
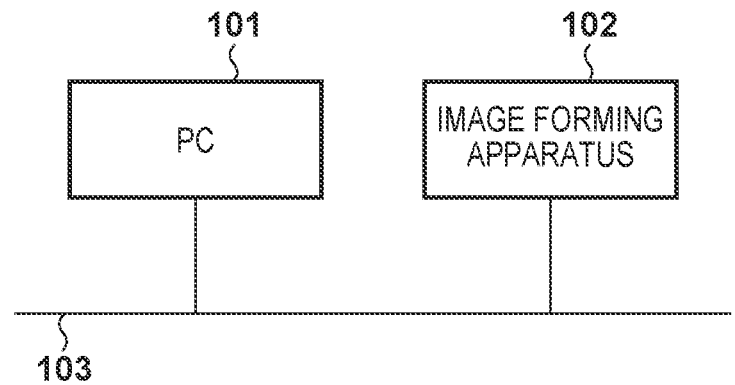
FIG. 1 is a view illustrating one example of a network configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

FIG. 1 is a view illustrating one example of a network configuration. A personal computer (PC) 101 which is an external apparatus through which a print job is inputted and an image forming apparatus 102 which is a printing apparatus (or printer) in which the inputted print job is processed are connected to a LAN 103. The number of PCs and the number of image forming apparatuses that are connected are not limited thereto. Note, although the origin of the input of a print job is the PC 101 in the present embodiment, the origin of the input may be a device other than a PC (such as a mobile terminal or another image forming apparatus, for example). Further, as the image forming apparatus 102, for example, a multi-function copying machine (MFP) or the like having a retention print function can be used.

Figure 2:
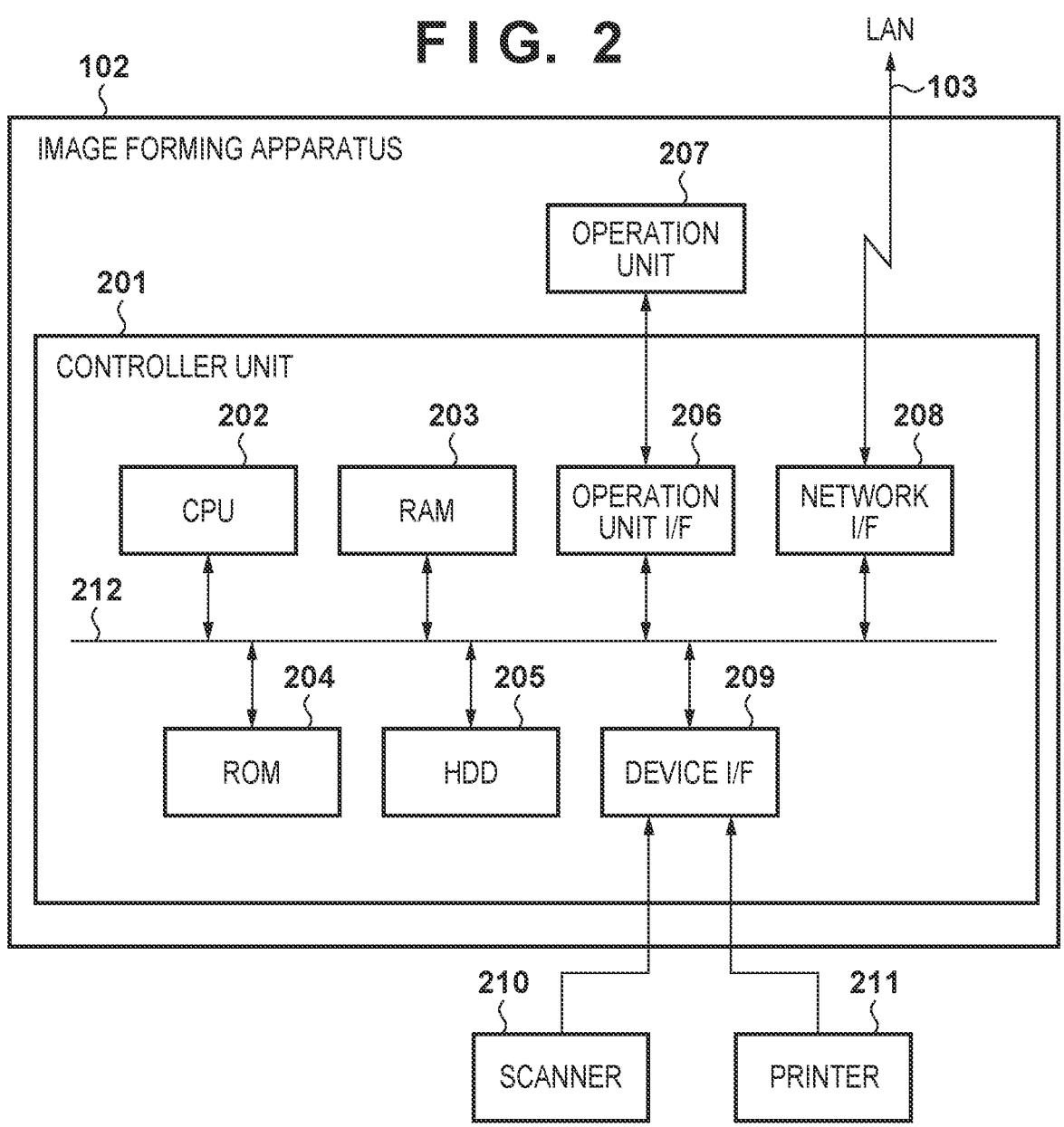
FIG. 2 is a block diagram illustrating an overall configuration of an image forming apparatus 102.

FIG. 2 is a block diagram showing an overall configuration of the image forming apparatus 102. A CPU 202 is a computation device that performs control of the overall system in a controller unit 201 of the image forming apparatus 102. A RAM 203 is a system work memory for operation of the CPU 202, and is an image memory that temporarily stores image data. The RAM 203 also stores data and programs such as an operating system, system software, and application software. A ROM 204 stores a system boot program. The hard disk drive (HDD) 205 stores an operating system, system software, application software, image data, setting data, and the like. Also, the HDD 205 functions as a storage unit for saving print jobs. An operation unit I/F 206 is an interface unit connected to an operation unit 207, and outputs information to be displayed on the operation unit 207, to the operation unit 207. The operation unit I/F 206 also accepts information input by the user using the operation unit 207. A network I/F 208 is connected to the network (LAN) 103 and performs input and output of information to/from a PC or another image forming apparatus connected to the same LAN. A device I/F 209 connects a scanner 210 and a printer 211, which are image input/output devices, with the controller unit 201, and performs input and output of image data to/from such devices. The above-mentioned devices are arranged on a system bus 212.

Figure 3:
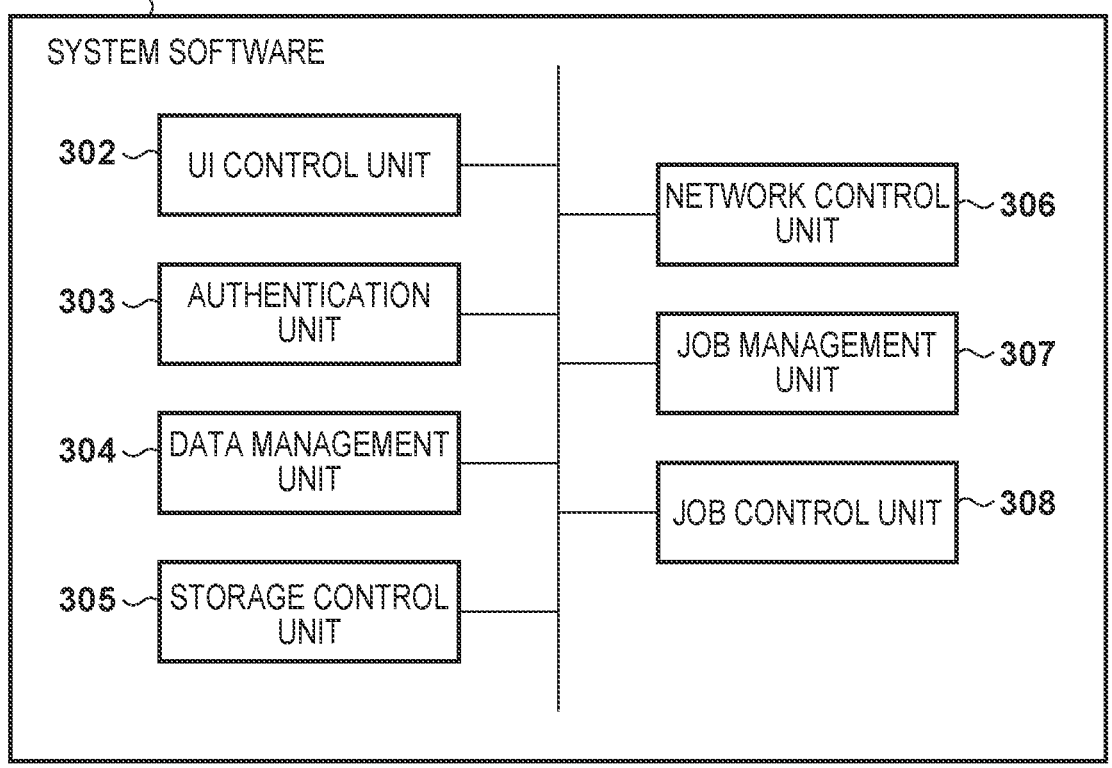
FIG. 3 is a block diagram illustrating a functional configuration of system software of the image forming apparatus 102.

FIG. 3 is a block diagram showing a functional configuration of system software of the image forming apparatus 102. System software 301 is stored in a storage such as the RAM 203, the ROM 204, or the HDD 205, and is executed by the CPU 202.

A UI control unit 302 receives information that a user inputted by the operation unit 207 via the operation unit I/F 206 and transmits the information to an authentication unit 303, a data management unit 304, and a job management unit 307. Alternatively, a response from the authentication unit 303, the data management unit 304, and the job management unit 307 is received and the information is outputted to the operation unit 207 via the operation unit I/F 206.

The authentication unit 303 performs authentication processing based on authentication information received from the UI control unit 302 and returns the result. In other words, the authentication unit 303 performs user authentication. The data management unit 304 receives a data write/read request from the UI control unit 302, a network control unit 306, or the job management unit 307, and transmits the data write/read request to a storage control unit 305. Alternatively, the data management unit 304 receives a response from the storage control unit 305 and transmits the information to the UI control unit 302, the network control unit 306, and the job management unit 307. The storage control unit 305 receives a data write/read request from the data management unit 304, writes/reads data to/from the HDD 205, and returns the result to the data management unit 304.

The network control unit 306 receives a request from an image forming apparatus or the PC 101 connected to the LAN 103 via the network I/F 208. Also, the network control unit 306 makes a request to the data management unit 304 or the job management unit 307 to perform processing in accordance with the received request. Also, the network control unit 306 receives a response from the data management unit 304 or the job management unit 307. Also, the network control unit 306 transmits a received response to an image forming apparatus or the PC 101 connected to the LAN 103 via the network I/F 208.

The job management unit 307 receives a job execution request from the UI control unit 302 or the network control unit 306, and manages the job. Also, the management unit requests job execution to a job control unit 308 or transmits a data write/read request to the data management unit 304. Alternatively, a response is received from the data management unit 304 or the job control unit 308 and the status of the job is transmitted to the UI control unit 302 and the network control unit 306.

The job control unit 308 receives a job execution request from the job management unit 307, and controls operations of the scanner 210 and the printer 211 via the device I/F 209. Alternatively, the job control unit 308 receives an operation state of the scanner 210 or the printer 211 via the device I/F 209 and transmits the operation state to the job management unit 307.

Figure 4:
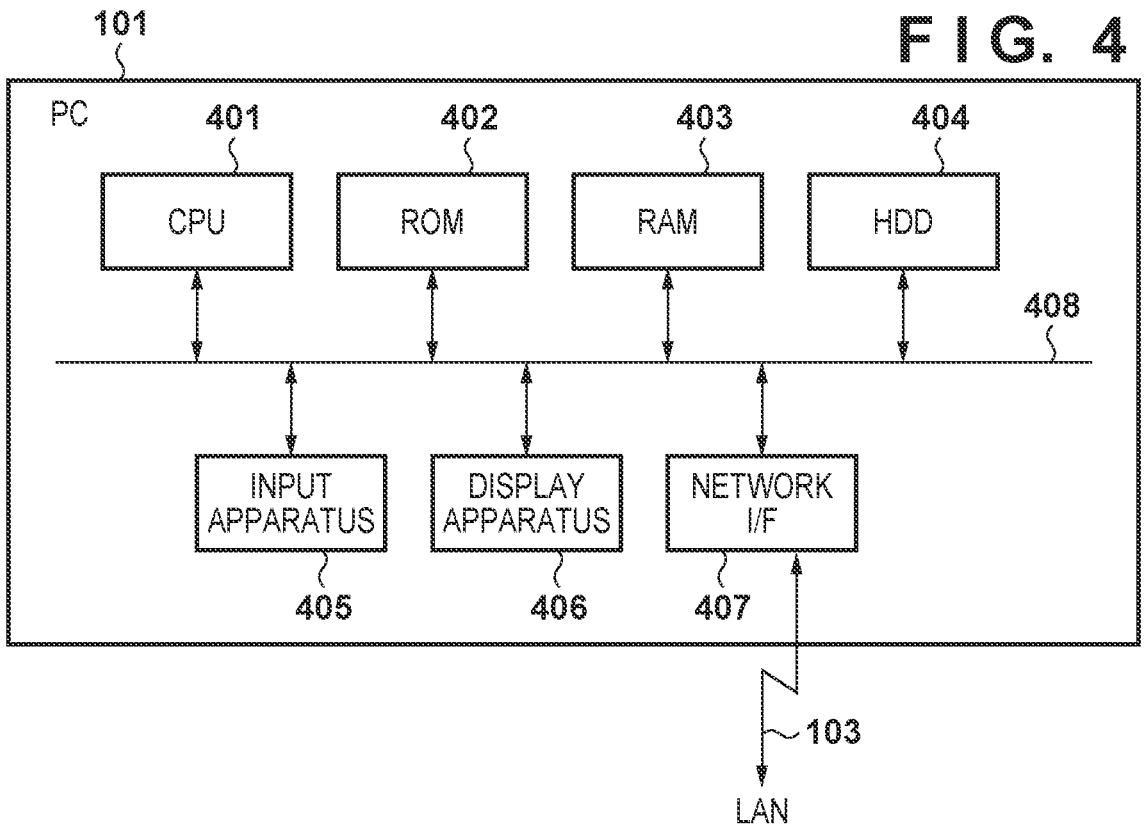
FIG. 4 is a block diagram illustrating an overall configuration of a PC 101.

FIG. 4 is a block diagram showing an overall configuration of the PC 101. In the PC 101, a CPU 401 is a computation device that performs overall control of the system. A ROM 402 stores programs and data related to processes. A RAM 403 is a system work memory for operation of the CPU and is a storage memory for storing temporary data related to each process. A hard disk drive (HDD) 404 stores programs and data related to processes, temporary data, application data, and the like. An input apparatus 405 is a keyboard or a pointing device that accepts instructions inputted to the PC 101. A display apparatus 406 displays the operation status of the PC 101 and information output by programs that operate on the PC 101. A network I/F 407 is connected to the network (LAN) 103 and performs input and output of information to/from a PC or another image forming apparatus connected to the same LAN. The above-mentioned elements are arranged on a system bus 408.

Note that, as a result of the CPU 401 executing processing based on programs corresponding to the operating system (OS), the printer driver, and applications stored in the HDD 404, functions (or processes) of the OS and the printer driver are realized.

Figure 5:
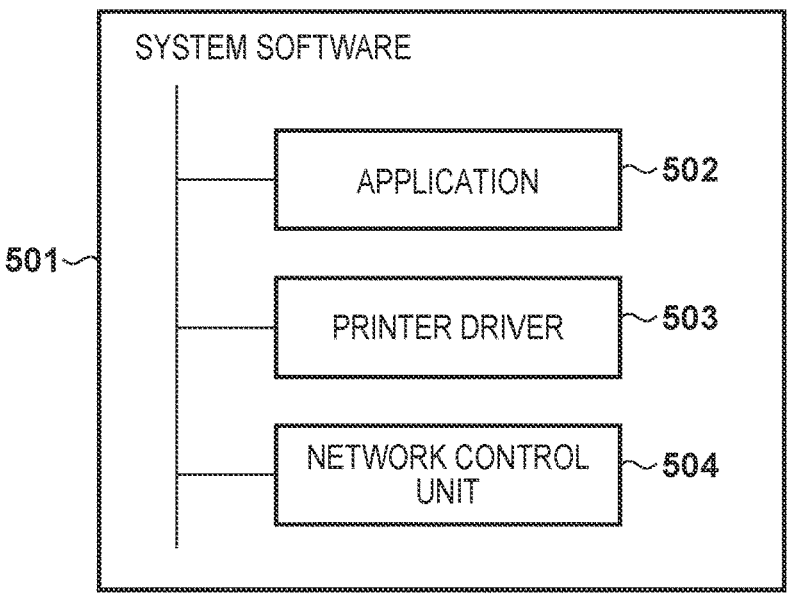
FIG. 5 is a block diagram illustrating a configuration of system software of the PC 101.

FIG. 5 is a block diagram showing a configuration of system software of the PC 101. System software 501 is stored in a storage, namely one of the ROM 402, the RAM 403, and the HDD 404, and is executed by the CPU 401.

The system software 501 is configured from an application 502, a printer driver 503, and a network control unit 504. The application 502 is a tool for generating and editing images and documents using the input apparatus 405 such as a pointing device and a keyboard, while the display apparatus 406 of the PC 101 is viewed, for example. Alternatively, the application 502 is a tool which references information within the image forming apparatus. The user creates data such as an image or a document by using the application 502, creates print instruction data by using the printer driver 503, and transmits these to an apparatus that can print such as the image forming apparatus 102 via the network control unit 504. Alternatively, information from the image forming apparatus 102 is obtained and referenced via the network control unit 504.

Generation and Transmission of a Print Job

Figure 6:
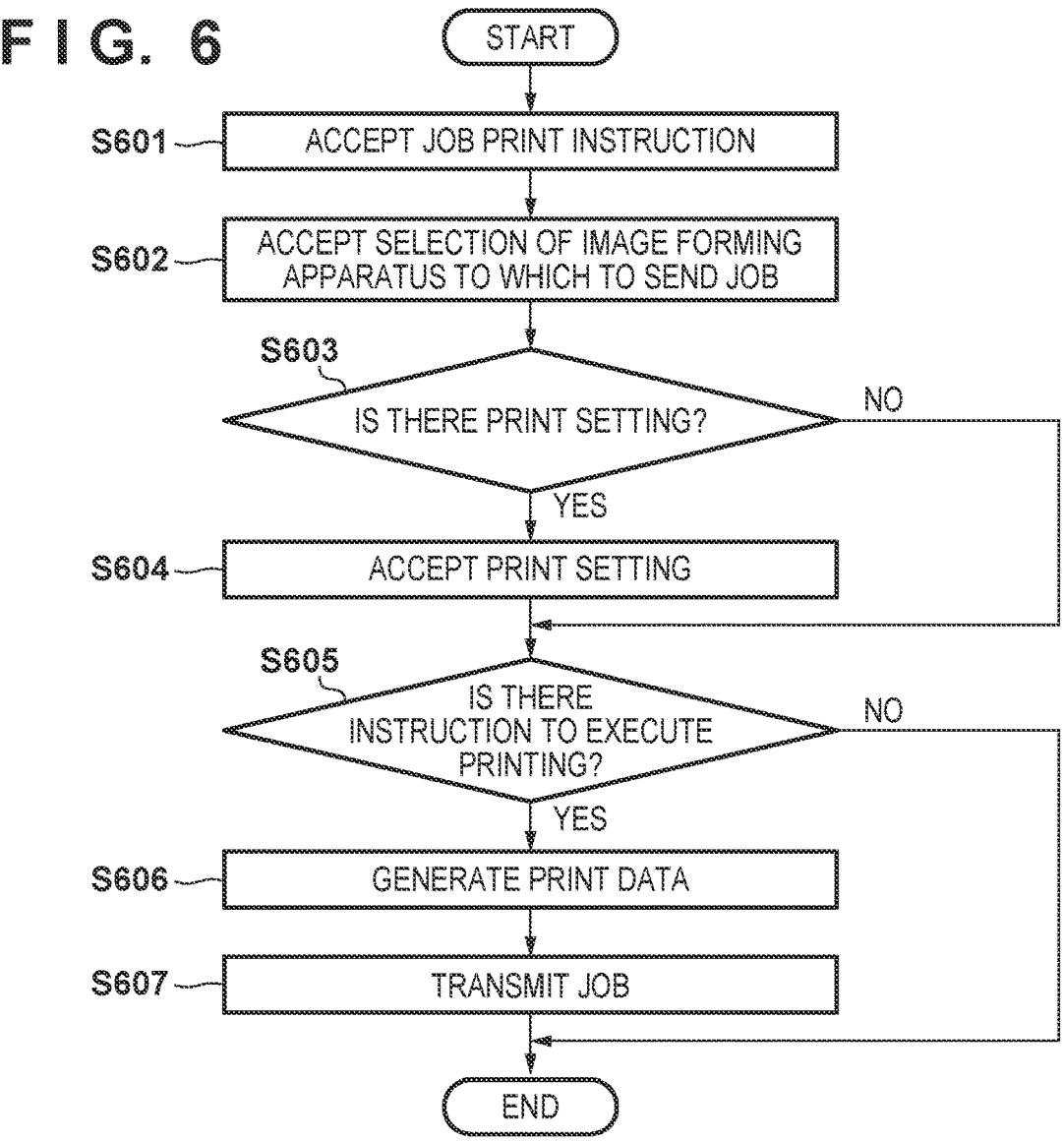
FIG. 6 is a flowchart describing input processing of a print job for which a printer driver was used from an application.

FIG. 6 is a flowchart for describing processing for inputting a print job for which a printer driver was used from an application, that is executed by the CPU 401 of the PC 101.

While viewing the display apparatus 406, the user generates data such as images and documents on the application 502, using the input apparatus 405 such as a pointing device or a keyboard, and makes a printing instruction. When the application 502 receives a print instruction (step S601), the application 502 displays a screen on the display apparatus 406 that allows the user to select a printer driver of the image forming apparatus which transmits the print job. After accepting (step S602) from the user the selection of the printer driver of the image forming apparatus 102 as the image forming apparatus that transmits the print job, the application 502 determines (step S603) whether a setting instruction was received from the user. In a case where a print setting instruction was not received, the processing transitions to step S605.

Figure 7A:
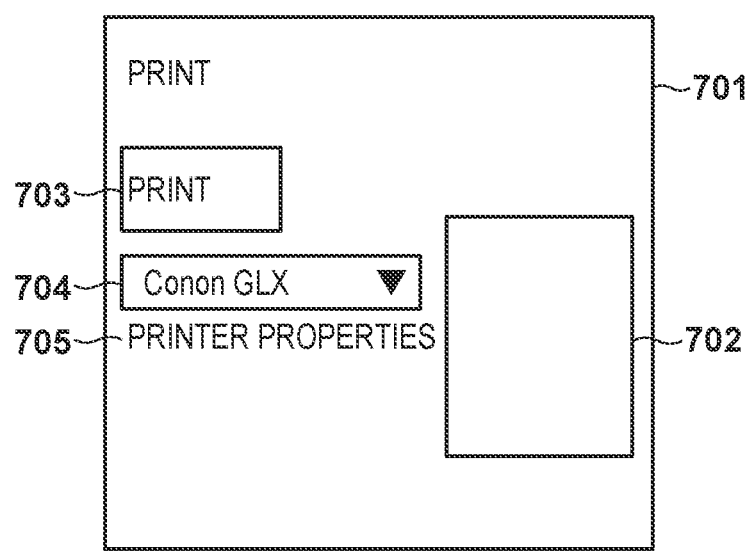

In a case where a print setting instruction is accepted, the setting screen of the printer driver 503 corresponding to the image forming apparatus 102 is displayed. FIG. 7A and FIG. 7B are views illustrating one example of a screen for after a print instruction; FIG. 7A is one example of a screen that allows a user to select a printer driver of the image forming apparatus which transmits a job. On a screen 701, a display region 702 is a display region for an image of data to be printed and a button 703 is a button for executing a print. A list 704 is a list for selecting a printer driver of an image forming apparatus for transmitting the job, and printer drivers of a plurality of image forming apparatuses which the user installed on the PC 101 are displayed. The user selects a desired printer driver from among the list of printer drivers. A character string 705 is a pressable character string for displaying a setting screen of the printer driver selected in the list 704.

FIG. 7B is a view illustrating one example of a setting screen for a printer driver; The user performs print settings on this setting screen. On a screen 706, an output method selection field 707 is an output method of a job and "print" or "secure print" are selectable. "Print" outputs a job in accordance with the print settings when the job is transmitted to the image forming apparatus. "Secure print" is a job that is designated to be temporarily saved on the image forming apparatus, and is assigned a password designated by the user. A print job for which "secure print" is specified is a retained job that is retained in the image forming apparatus 102. An OK button 708 is a button for finalizing the content of the setting and that closes the screen 706; a cancel button 709 is a button for discarding the content of the setting and that closes the screen 706. When printing a secure print job (in other words a retained job) saved in the image forming apparatus, after the job is selected by using the operation unit 207 of the image forming apparatus 102, the selected print job is outputted by inputting an assigned passcode.

After a setting instruction by the user is accepted in a case where there is a print setting instruction (step S604), the application 502 determines whether to accept an executing instruction for executing a print (step S605). In a case where it is determined that a print will be executed, a data generation request is made to the printer driver 503 corresponding to the selected image forming apparatus. The printer driver 503 creates (step S606) PDL (page description language) data in accordance with data such as an image or document, a document attribute such as a document name, a print setting, and the like. Then, the generated PDL data, print settings, or the like are transmitted to the image forming apparatus 102 as a print job in association with a user name (user identification information or a user ID) or including the user name (step S607).

Saving of a Print Job by the Image Forming Apparatus

Figure 8:
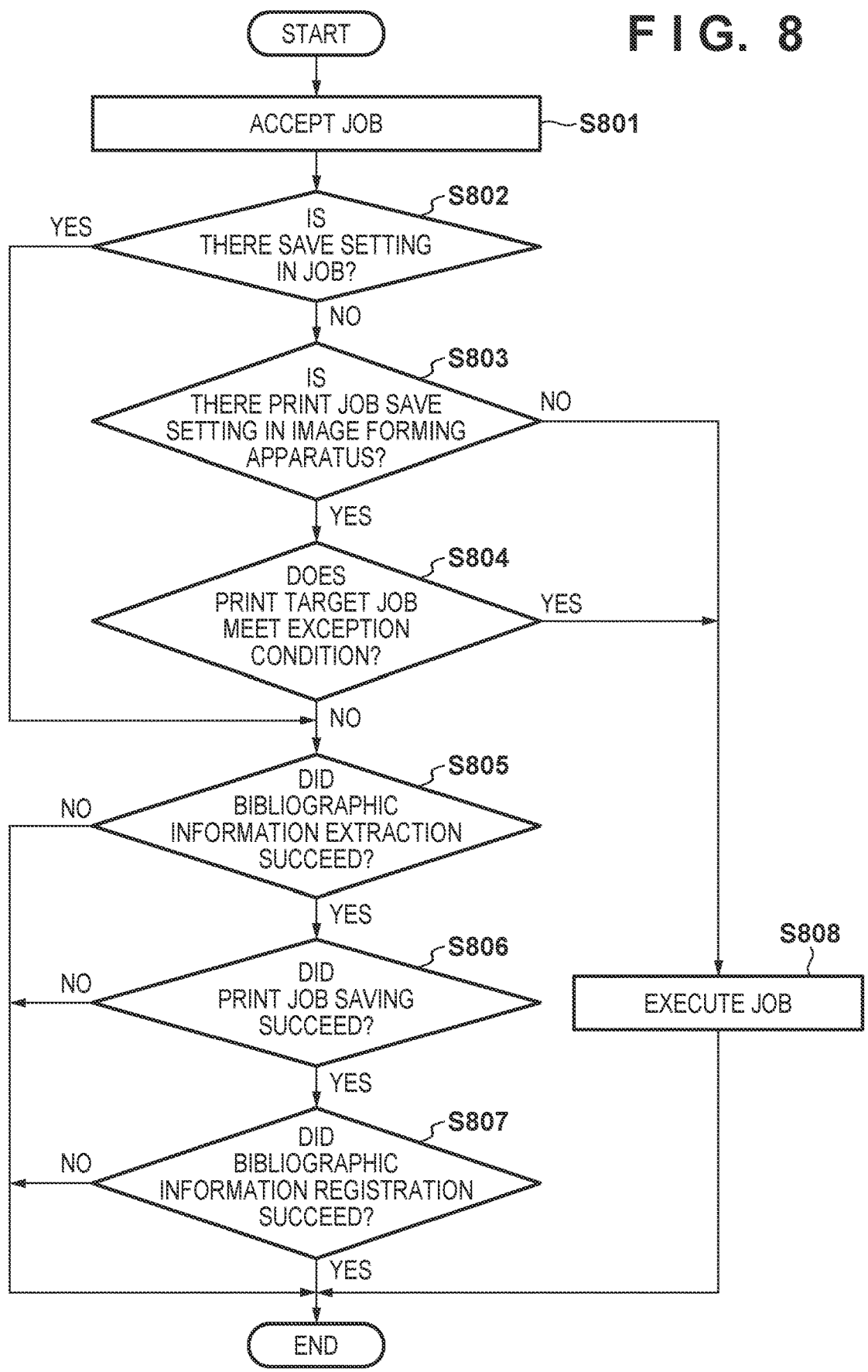
FIG. 8 is a flowchart describing storage processing of a print job.

FIG. 8 is a flowchart illustrating processing for storing a print job, in the system software 301, which is executed by the CPU 202 of the image forming apparatus 102.

When the network control unit 306 accepts a print job (step S801), the network control unit 306 transmits the print job to the job management unit 307. When the job management unit 307 accepts the print job, the job management unit 307 determines whether there is a save setting in the print job (step S802). A job in which there is a save setting is, in other words, a job in which "secure print" is designated as the output method on the setting screen of the printer driver 503. In a case where there is a save setting in the print job, the processing transitions to step S805. In a case where there is no save setting in the print job, it is determined whether there is a save setting for the print job in the image forming apparatus (step S803). A print job save setting may be set in respective image forming apparatuses and the storage control unit 305 stores such a setting in the HDD 205, the RAM 203, or the like. In a case where there is no print job save setting, the processing transitions to step S808. In a case where there is a print job save setting, the job management unit 307 further determines whether the print job satisfies an exception condition for printing (step S804). The exception condition is a condition for performing processing other than saving even if there is a print job save setting in the image forming apparatus. The exception condition is set in advance by an administrator or the like prior to a print being executed and holds a plurality of settings for one image forming apparatus.

Figure 9:
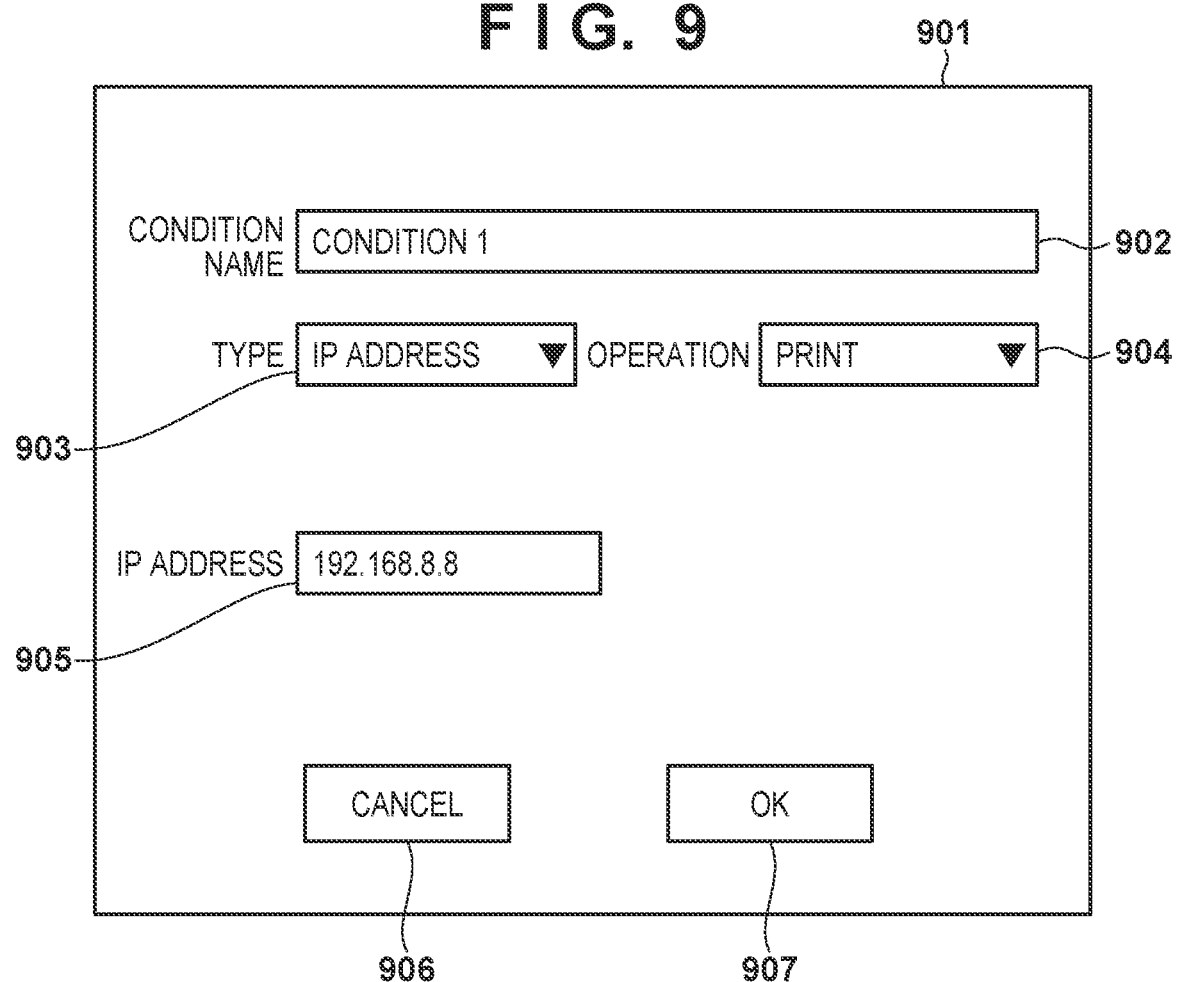
FIG. 9 is a view illustrating one example of an exception condition setting screen.

FIG. 9 is a view illustrating one example of an exception condition setting screen. In the present embodiment, the exception condition for printing without saving is, for example, that a print job is from a specific PC whose IP address was designated in an exception condition setting. On an exception condition setting screen 901, a region 902 is a region for inputting a condition name in which a condition name such as "condition name 1" is designated. A region 903 is a region for selecting a type; an exception condition such as a specific input job owner name, a specific IP address of the origin of the input, and a specific job input method (such as LPR or FTP) is selected thereby. "IP address" is selected in FIG. 9. A region 904 is a region for selecting processing for jobs that satisfy the condition of reference numeral 903, and for processing such as print or cancel can be selected. "Print" is selected in FIG. 9. A region 905 is a region for inputting a specific condition according to the type of condition. Since the type is IP address in FIG. 9, a region for inputting the IP address is displayed and an IP address "192.168.8.8" of the core system is designated. A button 906 is a cancel button for discarding the setting contents and a button 907 is an OK button 907 for confirming a setting; the storage control unit 305 stores the results to the HDD 205 and the RAM 203 in accordance with the pressing of the OK button 907.

In a case where it is determined that the print target job satisfies the exception condition in step S804, the processing transitions to step S808. In a case where the print target job does not match the exception condition, the job management unit 307 transmits the print job to the data management unit 304. The data management unit 304 analyzes the print job received from the job management unit 307 and extracts bibliographic information (step S805). The data management unit 304 then transmits the print job and the extracted bibliographic information to the storage control unit 305. When extraction of bibliographic information succeeds, the storage control unit 305 saves the received print job to the HDD (step S806), and when saving succeeds, the extracted bibliographic information is linked with, in other words is associated with a user ID (user identification information) and is saved to the HDD 205 (step S807). The saved print job includes print data and this is also saved in association with the user ID. Accordingly, the bibliographic information and the print job are associated according to the user ID and saved. Needless to say, the bibliographic information and the print job may be directly associated by another method.

FIG. 10 is a view illustrating one example of a bibliographic information table. A bibliographic information table 1001 is a bibliographic information table of a user UserA. The bibliographic information table 1001 includes as print job input information, a date/time 1002 when the print job was inputted, an IP address 1003 of an image forming apparatus to which the print job was inputted, and a storage location 1004 of the inputted print job. Also, as print job attribute information, a print job name 1005, a print setting 1006, a number of pages 1007 of the print job, whether or not there is a password for when printing 1008, and a processing state 1009 which indicates whether the print job was printed are included. In a case where there is a password, the password information is also saved by being further associated with the bibliographic information. For the processing of step S805, step S806, and step S807, in a case where the processing fails due to a reason such as there being no free space in the HDD 205, for example, the processing ends. In a case where registration of the bibliographic information succeeds, the processing for saving the retained job ends.

In step S803, in a case where it is determined that there is no save setting in the image forming apparatus, or in step S804, in a case where it is determined that the print target job meets an exception condition, the job management unit 307 performs logical print queue processing and then executes the print job (step S808). According to the foregoing processing, processing for saving the print job is performed.

Automatic Printing after Authentication

Figure 11:
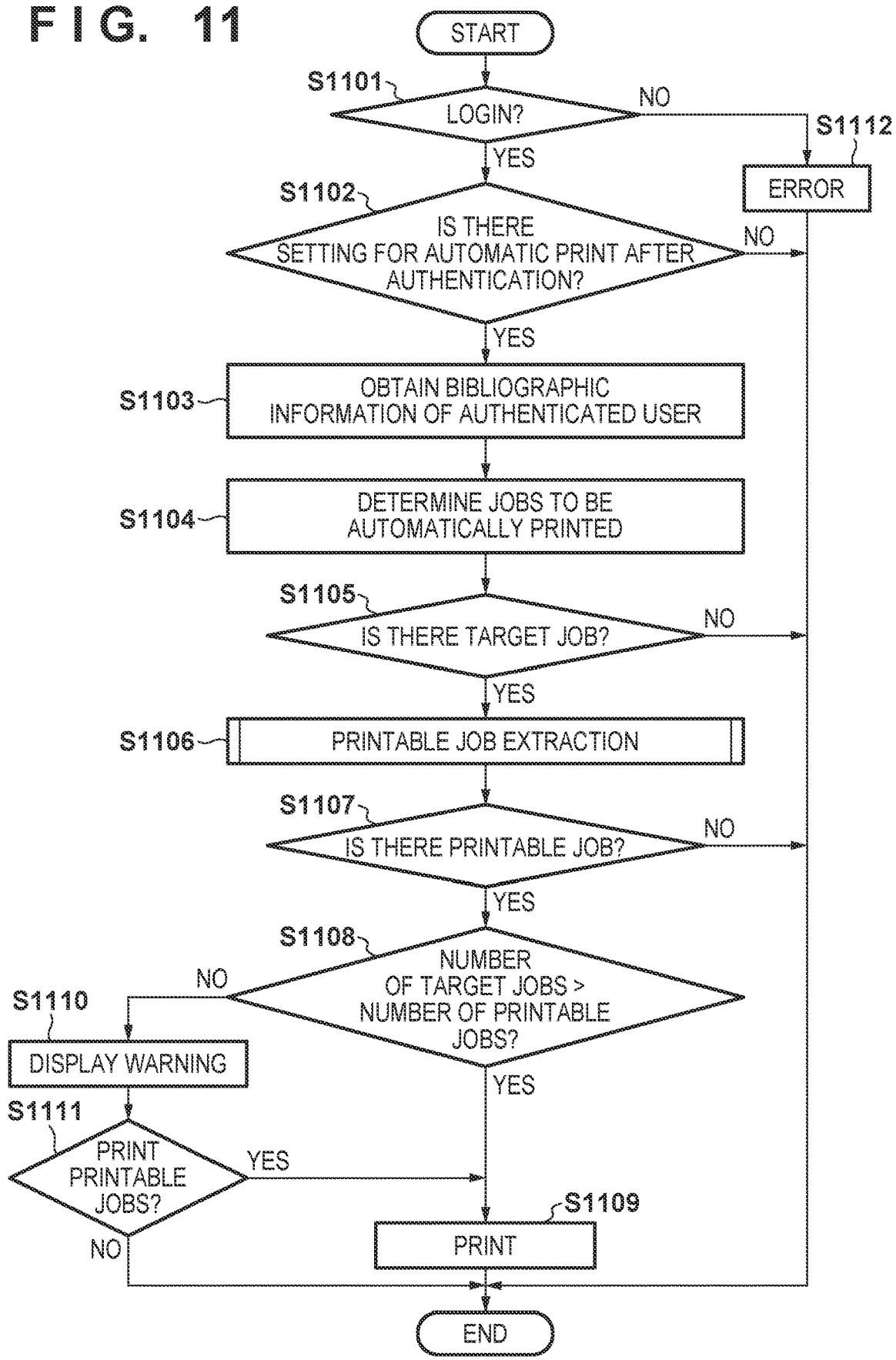
FIG. 11 is a flowchart describing processing of automatic printing after authentication.

FIG. 11 is a flowchart illustrating processing for automatically printing after authentication, in the system software 301, which is executed by the CPU 202 of the image forming apparatus 102.

The authentication unit 303 performs login processing based on login information inputted to the operation unit 207 by a user and the user management table saved in the HDD 205 (step S1101). FIG. 12 is a view illustrating one example of a login screen. A region 1201 is a user name input region, a region 1202 is a login password input region, a region 1203 is a login destination input region, and a button 1204 is a button for executing login by the user name and login password that were inputted. A button 1205 is a cancel button for closing the login screen. FIG. 13 is a view illustrating one example of the user management table. In a user management table 1301, an item 1302 is a user name, an item 1303 is a login password, and an item 1304 is a role indicating an authority of the user. The user inputs the user name and password on the screen of FIG. 12 when logging in, designates the image forming apparatus 102 itself as the login destination, for example, and touches the login button 1204. The image forming apparatus 102, in particular the authentication unit 303, searches the user management table 1301 of FIG. 13 in accordance with the inputted user name and password, and permits the login of the user if there is a hit. In such a case, the login is successful and the authority of the user is determined by the role 1304. If there is no hit, the login is a failure.

In a case where the login processing fails, error processing is performed (step S1112) and the processing ends. The error processing may be displaying a login failure and acceptance of the confirmation input, for example. In a case where the login processing succeeded, the authentication unit 303 notifies, to the UI control unit 302, that the login processing succeeded and information of the user who logged in. The UI control unit 302, after receiving the notification of the success of the login processing from the authentication unit 303, determines a setting of whether or not to perform an automatic print after authentication (step S1102).

A setting of whether or not to perform an automatic print after authentication is performed from the operation unit 207 by the user. FIG. 14 is a view illustrating one example of a setting screen of automatic printing after authentication. In a screen 1401, a checkbox 1402 is a checkbox of whether or not to enable automatic printing after authentication. Automatic printing after authentication becomes enabled when the checkbox 1402 is checked. A button 1403 is an OK button for confirming the setting contents and closing the screen 1401. An automatic print after authentication setting may be set in respective image forming apparatuses and the storage control unit 305 stores such a setting in the HDD 205, the RAM 203, or the like. Note, a setting of for automatic printing may also be performed per user. In this case, if a setting for automatic printing after authentication is saved in the user management table 1301 of FIG. 13 in association with the user, it can be referenced immediately at the time of log in.

In a case where it is determined that automatic printing after authentication is not set in step S1102, the processing ends. In a case where automatic printing after authentication is set, the UI control unit 302 obtains from the data management unit 304 a list of bibliographic information associated with information of a logged in user received by the notification from the authentication unit 303 (step S1103). Next, the UI control unit 302 determines a print job to be automatically printed from the obtained bibliographic information (step S1104). In the present embodiment, for the print job to be automatically printed, in the bibliographic information table 1001, the password 1008 is not set and the print status 1009 is a waiting to print job, but there is no limitation to this. In a case where it is determined that there is no print job to be automatically printed (NO in step S1105), the processing ends. In a case where it is determined that there is a job that is to be automatically printed (YES in step S1105), the UI control unit 302 transmits bibliographic information of a job to be automatically printed to the job management unit 307 and also performs a request to extract printable jobs (step S1106). The extraction processing of printable jobs is described later with reference to FIG. 16.

In a case where the result of the printable job extraction processing is determined to be that there is no printable job, the processing ends. In a case where it is determined that there is a printable job, the number of jobs determined as jobs to be automatically printed in step S1104 and the number of jobs determined as printable jobs in step S1106 are compared (step S1108). In a case where the number of jobs to be automatically printed is greater than the number of printable jobs, in other words, in a case where the jobs to be automatically printed cannot all be printed, a warning screen indicating that the jobs to be automatically printed cannot all be printed is displayed on the operation unit 207 (step S1110). Accordingly, an input instruction to the user as to whether or not to print the printable jobs is accepted. FIG. 15 is a view illustrating one example of the warning screen. In a screen 1501, a button 1502 is text indicating a warning, reference numeral 1502 is a button for instructing to print the printable jobs, and a button 1503 is a button for instructing to not print the printable jobs.

When either instruction is inputted to the screen 1501 by the user, it is determined whether to print the printable jobs based on the input of the user (step S1111), and in a case where it is determined that the printable jobs are to be printed, a print request for the jobs extracted in step S1106 is made to the job management unit 307. The job management unit 307 transmits the received print request to the job control unit 308, the job control unit 308 executes printing in accordance with the received print request (step S1109), and the processing ends. On the other hand, in a case where it is determined that the printable jobs are not to be printed, the processing ends. In step S1108, in a case where the jobs that are to be automatically printed can all be printed, the processing of step S1109 is performed on the target print jobs and then the processing ends. The processing of automatic printing after authentication is performed according to the above-described process.

Note, configuration may be taken such that, in step S1110 and step S1111, in a case where the jobs to be automatically printed can all be printed, it is determined whether or not the printable jobs are to be printed according to an instruction by the user, but configuration may also be taken such that only the printable jobs are printed without displaying a warning screen. In such a case, if it determined that there is a printable job in step S1107, the processing branches to step S1109.

Note, configuration may be taken such that, in step S1110 and step S1111, in a case where the jobs to be automatically printed cannot all be printed, it is determined whether or not the printable jobs are to be printed according to an instruction by the user, but configuration may also be taken such that whether or not to print all of the jobs to be automatically printed are included in selection items. In such a case, if it determined that there is a printable job in step S1107, the processing branches to step S1110.

Note, in step S1110, on the screen notified to the operation unit 207, configuration may be taken so as to notify information relating the printable jobs such as the number of jobs, the job names, or the like.

Figure 16:
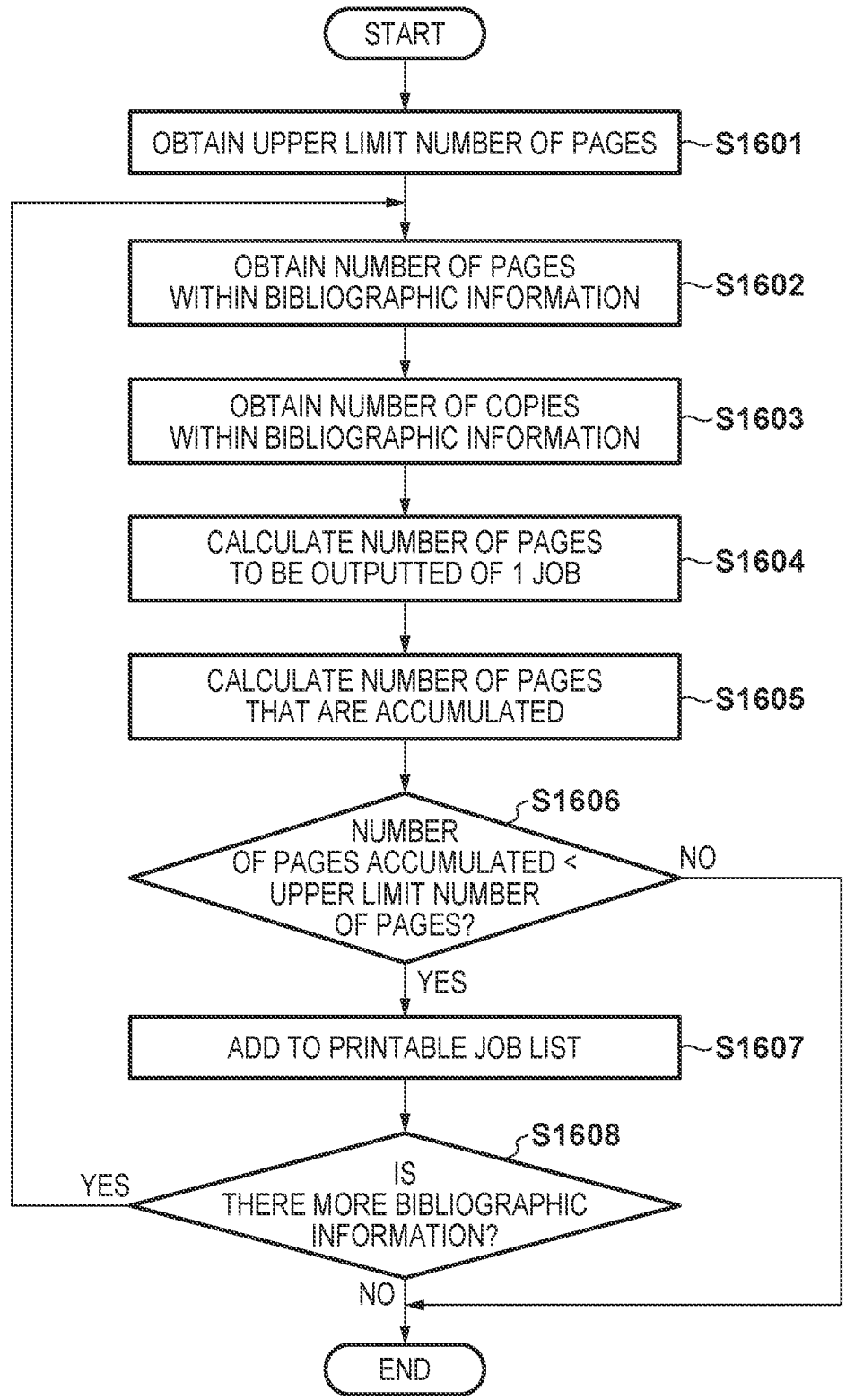
FIG. 16 is a flowchart describing printable job extraction processing based on an upper limit of a number of pages.

FIG. 16 is a flowchart describing processing for extracting printable jobs that is executed by the CPU 202 of the image forming apparatus 102 according to a page number upper limit in the system software 301. This illustrates details of step S1106 of FIG. 11.

The job management unit 307 obtains an upper limit on the number printable pages (or a page upper limit) (step S1601). A setting of an upper limit on the number of printable pages is performed by the user using the operation unit 207. The setting of the upper limit on the number of pages is set for every image forming apparatus, and the storage control unit 305 stores the setting to the HDD 205, the RAM 203, or the like.

Next, bibliographic information received from the UI control unit 302 is sequentially focused on from a first bibliographic information item, and information on the number of pages and information on the number of copies within the focused bibliographic information are obtained (step S1602 and step S1603). Firstly the first bibliographic information is focused on. The job management unit 307 calculates from the obtained information on the number of pages and information on the number of copies, a number of pages to be outputted (step S1604), and stores a result summing up the number of pages to be outputted for each calculated print job in the RAM 203 as an accumulated number of pages (or a total number of pages) (step S1605). It is determined whether the accumulated number of pages is less than the upper limit on the number of pages (step S1606), and in a case where it is less, in other words, in a case where the number of printable pages is not reached, the obtained bibliographic information is stored in the RAM 203 as a printable job (step S1607). This storage is performed such that the bibliographic information or information indicating the bibliographic information (such as a job ID of the print job, for example) is added to a previously stored job list of targets of execution. Note, the job list is empty when the processing of FIG. 16 starts. It is determined whether or not there is more bibliographic information (step S1608) and if there is more bibliographic information, the processing transitions to step S1602. In a case where there is no more bibliographic information, in other words, in a case where the calculation of the number of pages for all the received bibliographic information has completed, the processing ends, and the bibliographic information (specifically, a job list to which bibliographic information was added in step S1607) of printable jobs is transmitted to the UI control unit 302. In a case where the accumulated number of pages does not reach the upper limit on the number of pages in step S1606, the processing ends and bibliographic information of the printable jobs is transmitted to the UI control unit 302.

The processing for extracting the printable jobs according to the upper limit of the number of pages is performed according to the above described processing. Note that although information of a number of pages and a number of copies is used in the page calculation processing in the present embodiment, the calculation is not limited to this method, and the calculation may include other print settings within the bibliographic information that change the number of pages.

Note, although processing ends in a case where the accumulated number of pages reaches the upper limit on the number of pages in step S1606 in the present embodiment, configuration may be such that jobs step S1608 is transitioned to, so that if there is a subsequent job that falls within the range of the upper limit on the number of pages, it is extracted as a print target.

Also, in the present embodiment, since the upper limit on the number of pages is used as an index for the time that will be required for printing, the number of pages may be set with a predetermined size, for example, A4 size, as a reference. In a case where pages of a size other than A4 will be printed, a ratio of the required time per one page may be used to convert the page number into the equivalent number of A4 pages. For example, in a case where the upper limit number of pages is set for the A4 size as the standard, the number of pages of the respective print jobs may be converted into the equivalent number of pages in the A4 size in the counting.

For example, if the required printing time per one page of an A3 size is twice that of the A4 size, for a print job in which the sheet size is an A3 size, the total number of pages of the job may be counted as doubled in order to convert to the A4 standard. Then by using this value, the printable jobs may be determined. Of course, in a case where the print time per page is shorter than the reference size, appropriate conversion can also be made.

[Variation]

Figure 17:
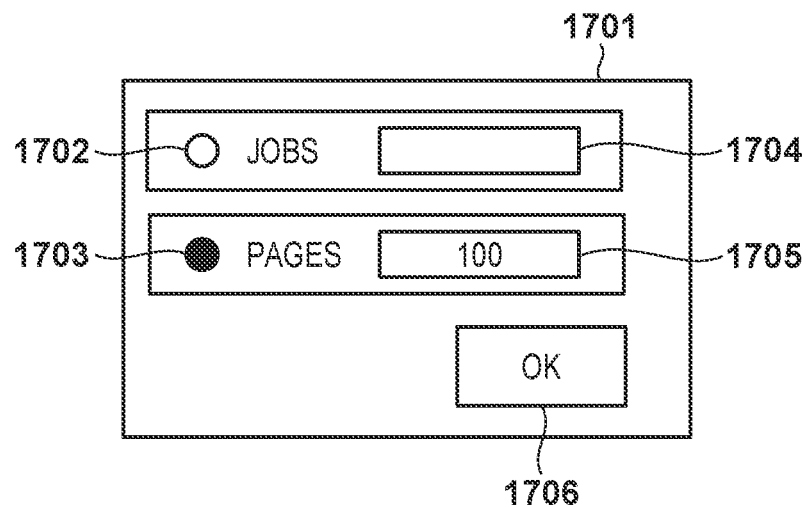
FIG. 17 is a view illustrating one example of an upper limit value setting screen.

Although the setting of the upper limit value in the foregoing embodiment is an upper limit on the number of pages, limitation is not made to this. FIG. 17 is a view illustrating one example of an upper limit value setting screen. In an upper limit value setting screen 1701, a radio button 1702 is a radio button for selecting an upper limit on the number of jobs and a radio button 1703 is a radio button for selecting an upper limit of the number of pages. Since the buttons are radio buttons, either one will be selected. A region 1704 is a region for setting an upper limit on the number of jobs and a region 1705 is a region for setting an upper limit on the number of pages. The value set for the selected radio button is employed as the upper limit value. A button 1706 is a button for confirming contents of the setting and for closing the screen 1701. Configuration may be taken such that the user selects either the radio button 1702 or the radio button 1703 by the upper limit value setting screen 1701. In a case where the user selects reference numeral 1702, processing for extracting printable jobs according to the upper limit on the number of jobs described later is performed. In a case where the user selects reference numeral 1703, processing for extracting printable jobs according to the upper limit on the number of pages that was described previously is performed.

Figure 18:
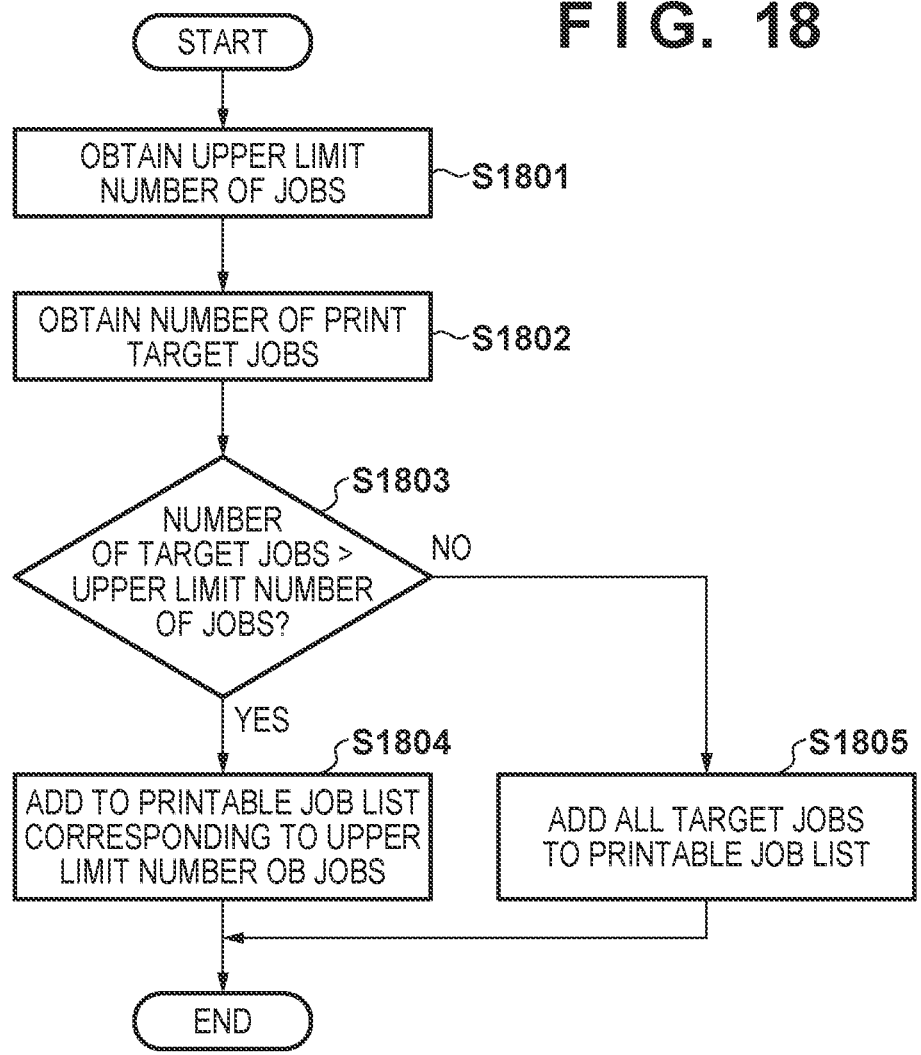
FIG. 18 is a flowchart describing printable job extraction processing based on an upper limit of a number of jobs.

FIG. 18 is a flowchart describing processing for extracting printable jobs that is executed by the CPU 202 of the image forming apparatus 102 according to a job number upper limit in the system software 301. This processing is executed in a case where reference numeral 1702 is selected. The procedure of FIG. 18 indicates details of the procedure executed in step S1106 of FIG. 11 in a case where the radio button 1702 for setting the upper limit value of the number of jobs is selected in FIG. 17.

The job management unit 307 obtains the upper limit number of printable jobs (step S1801). A setting of the upper limit number of printable jobs is performed from the operation unit 207 by the user. The setting of the upper limit number of jobs is set on the respective image forming apparatuses and the storage control unit 305 stores the setting in the HDD 205, the RAM 203, or the like.

Next, a bibliographic information number for jobs to be printed received from the UI control unit 302 is obtained (step S1802). The job management unit 307 determines whether or not the obtained number of bibliographic information for the jobs to be printed is larger than the upper limit on the number of jobs (step S1803), and in a case where it is larger, bibliographic information corresponding to the upper limit on the number of jobs of the bibliographic information is stored in the RAM 203 as printable jobs (step S1804) in an order starting from a first bibliographic information item, and the process ends, for example. In a case where the obtained number of bibliographic information of jobs to be printed is less than or equal to the upper limit number of jobs, obtained bibliographic information of all jobs to be printed is stored in the RAM 203 as the printable jobs (step S1805), and the processing ends. The processing for extracting the printable jobs according to the upper limit of the number of pages is performed according to the above described processing.

According to the present embodiment and the variation, for automatic printing after authentication, print jobs that are to be automatically printed are all printed if the number of pages of all print jobs that are to be automatically printed is within the upper limit on the number of pages set in advance. Only printable jobs from among the range of the upper limit of the number of pages are printed in a case where the number of pages of all print jobs to be automatically printed is larger than the upper limit on the number of pages set in advance. By this, it is possible to prevent a long monopolization of an image forming apparatus.

Also, it is possible to construct a print environment that accords to image forming apparatus usage conditions since it is possible to set an upper limit on the number of pages.

Also, by the display of the warning, it is possible for a user to both select whether to execute printing and also to correctly know what the print results will be in a case where the number of pages of all of the print job that is to be automatically printed is larger than the upper limit on the number of pages that is set in advance.

Also, by calculating the number of pages in consideration of a print setting added to a print job, it is possible to improve accuracy in determining the upper limit of the number of pages.

Also, in a case where the accumulated number of pages reaches the upper limit on the number of pages, it is possible to improve productivity in printing within the upper limit by configuring to also extract, as print targets, jobs thereafter that fall within the range of the upper limit on the number of pages.

Also, by a configuration being taken such that the upper limit of the number of pages or the upper limit of the number of jobs can be selected, a printing environment that accords to the usage conditions of the image forming apparatus can be constructed.

Other Embodiments

Embodiment(s) of the present disclosure can also be realized by a computer of a system or apparatus that reads out and executes computer executable instructions (e.g., one or more programs) stored on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-108228, filed 10 Jun. 2019, which is hereby incorporated by reference herein in its entirety.

What is claimed is:

1. A printing apparatus comprising:
one or more memories; and
one or more processors that execute a set of instructions to:
receive a print job from an external apparatus;
store in a storage device the received print job in association with user identification information;
receive authentication information of a user;
specify print jobs which are stored in the storage device and are associated with user identification information of the user; and
execute at least one of the specified print jobs in accordance with success of authentication of the user,
wherein, in a case where a total number of pages of the specified print jobs exceeds an upper limit number, one or more print jobs from among the specified print jobs are executed,
wherein a total number of pages of the one or more print jobs falls within the upper limit number, and wherein the upper limit number is a fixed value used for execution of the one or more print jobs in accordance with one-time success of the authentication of the user.

2. The printing apparatus according to claim 1, wherein the stored print jobs are sequentially focused on from a first print job associated with the user identification information, a number of pages of the focused print job is accumulated, and if the accumulated number of pages does not exceed the upper limit number, the focused print job is added to print jobs to be executed.

3. The printing apparatus according to claim 2, wherein if the accumulated number of pages exceeds the upper limit number, the print jobs added thus far are made to be print jobs to be executed.

4. The printing apparatus according to claim 2, wherein if the accumulated number of pages exceeds the upper limit number, print jobs that have not yet been focused on among the saved print jobs associated with the user identification information are focused on, and
if the saved print jobs associated with the user identification information have all been focused on, the print jobs added thus far are made to be print jobs to be executed.

5. A printing apparatus comprising:
one or more memories; and
one or more processors that execute a set of instructions to:
receive a print job from an external apparatus;
store in a storage device the received print jobs in association with user identification information;
receive authentication information of a user;
specify print jobs which are stored in the storage device and are associated with user identification information of the user; and
execute at least one of the specified print jobs in accordance with success of authentication of the user,
wherein, in a case where a number of the specified print jobs exceeds an upper limit number, one or more print jobs from among the specified print jobs are executed, wherein a number of the one or more print jobs falls within the upper limit number, and wherein the upper limit number is a fixed value used for execution of the one or more print jobs in accordance with one-time success of the authentication of the user.

6. The printing apparatus according to claim 5, wherein the following is further executed:
in a case where the print jobs to be executed do not include every print job that is stored in the storage device and is associated with the user identification information, a warning screen is displayed.

7. A control method for a printing apparatus, the control method comprising:
receiving a print job from an external apparatus;
storing in a storage device the received print job in association with user identification information;
receiving authentication information of a user;
specifying print jobs which are stored in the storage device and are associated with user identification information of the user; and
executing at least one of the specified print jobs in accordance with success of authentication of the user;
wherein, in a case where a total number of pages of the specified print jobs exceeds an upper limit number, one or more print jobs from among the specified print jobs are executed, wherein a total number of pages of the one or more print jobs falls within the upper limit number, and wherein the upper limit number is a fixed value used for execution of the one or more print jobs in accordance with one-time success of the authentication of the user.

8. A control method for a printing apparatus, the control method comprising:
receiving a print job from an external apparatus;
storing in a storage device the received print job in association with user identification information;
receiving authentication information of a user;
specifying print jobs which are stored in the storage device and are associated with user identification information of the user; and
executing at least one of the specified print jobs in accordance with success of authentication of the user,
wherein in a case where a number of the specified print jobs exceeds an upper limit number, one or more print jobs from among the specified print jobs are executed, wherein a number of the one or more print jobs falls within the upper limit number, and wherein the upper limit number is a fixed value used for execution of the one or more print jobs in accordance with one-time success of the authentication of the user.

9. A non-transitory computer readable storage medium on which is stored a computer program for making a computer execute a control method for a printing apparatus, the control method comprising:
receiving a print job from an external apparatus;
storing in a storage device the received print job in association with user identification information;
receiving authentication information of a user;
specifying print jobs which are stored in the storage device and are associated with user identification information of the user; and executing at least one of the specified print jobs in accordance with success of authentication of the user;

wherein, in a case where a total number of pages of the specified print jobs exceeds an upper limit number, one or more print jobs from among the specified print jobs are executed, wherein a total number of pages of the one or more print jobs falls within the upper limit number, and wherein the upper limit number is a fixed value used for execution of the one or more print jobs in accordance with one-time success of the authentication of the user.

10. A non-transitory computer readable storage medium on which is stored a computer program for making a computer execute a control method for a printing apparatus, the control method comprising:

receiving a print job from an external apparatus;

storing in a storage device the received print job in association with user identification information;

receiving authentication information of a user;

specifying print jobs which are stored in the storage device and are associated with user identification information of the user; and executing at least one of the specified print jobs in accordance with success of authentication of the user, wherein in a case where a number of the specified print jobs exceeds an upper limit number, one or more print jobs from among the specified print jobs are executed, wherein a number of the one or more print jobs falls within the upper limit number, and wherein the upper limit number is a fixed value used for execution of the one or more print jobs in accordance with one-time success of the authentication of the user.

11. The printing apparatus according to claim 1, wherein, in a case where a total number of pages of the specified print jobs exceeds the upper limit number, the one or more print jobs to be executed are decided in a unit of a job.

12. The printing apparatus according to claim 1, wherein the specified print jobs are targeted to be executed in accordance with success of the user authentication.

13. The printing apparatus according to claim 5, wherein the specified print jobs are targeted to be executed in accordance with success of the user authentication.

* * * * *